(12) United States Patent
Gorokhov et al.

(10) Patent No.: US 9,473,224 B2
(45) Date of Patent: Oct. 18, 2016

(54) METHOD AND APPARATUS FOR HIERARCHICAL CODEBOOK DESIGN IN WIRELESS COMMUNICATION

(71) Applicant: QUALCOMM Incorporated, San Diego, CA (US)

(72) Inventors: Alexei Yurievitch Gorokhov, San Diego, CA (US); Amir Farajidana, Sunnyvale, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 14/276,290

(22) Filed: May 13, 2014

(65) Prior Publication Data
US 2014/0247739 A1    Sep. 4, 2014

Related U.S. Application Data (62) Division of application No. 12/917,420, filed on Nov. 1, 2010, now Pat. No. 8,761,086.

(60) Provisional application No. 61/257,420, filed on Nov. 2, 2009.

(51) Int. Cl.
| | | |
|---|---|---|
| H04B 7/04 | (2006.01) | |
| H04W 24/10 | (2009.01) | |
| H04B 7/02 | (2006.01) | |
| H04B 7/06 | (2006.01) | |
| H04L 27/26 | (2006.01) | |

(52) U.S. Cl.
CPC ............ *H04B 7/0456* (2013.01); *H04B 7/024* (2013.01); *H04B 7/0452* (2013.01); *H04B 7/0478* (2013.01); *H04W 24/10* (2013.01); *H04B 7/022* (2013.01); *H04B 7/0639* (2013.01); *H04L 27/2601* (2013.01)

(58) Field of Classification Search
None
See application file for complete search history.

(56) References Cited

U.S. PATENT DOCUMENTS

| | | |
|---|---|---|
| 8,014,455 B2 | 9/2011 | Kim et al. |
| 8,204,151 B2 | 6/2012 | Kim et al. |
| 8,351,544 B2 | 1/2013 | Mondal et al. |

(Continued)

FOREIGN PATENT DOCUMENTS

| | | |
|---|---|---|
| CN | 101297514 A | 10/2008 |
| JP | 2008501272 A | 1/2008 |

(Continued)

OTHER PUBLICATIONS

International Search Report and Written Opinion—PCT/US2010/055156—ISA/EPO—Apr. 5, 2011.

(Continued)

*Primary Examiner* — Brian Roberts
(74) *Attorney, Agent, or Firm* — Liem T. Do (57) ABSTRACT

Methods and apparatuses for wireless communication are provided. In an aspect, the method includes receiving a plurality of channel quality reports based on a multiple description coding schedule and determining a transmission parameter based on the plurality of channel quality reports. In another aspect, the method includes receiving a family of codebooks organized based on a transmission rank, and reporting, using a multiple description coding scheme, a channel quality parameter using a codebook entry from the family of codebooks.

16 Claims, 5 Drawing Sheets

(56) References Cited

U.S. PATENT DOCUMENTS

| | | |
|---|---|---|
| 8,385,441 B2 | 2/2013 | Perets et al. |
| 8,428,177 B2 | 4/2013 | Tsai et al. |
| 2007/0049218 A1 | 3/2007 | Gorokhov et al. |
| 2007/0191066 A1* | 8/2007 | Khojastepour et al. ... 455/562.1 |
| 2007/0224995 A1 | 9/2007 | Frederiksen et al. |
| 2007/0265037 A1 | 11/2007 | Pan et al. |
| 2008/0165869 A1 | 7/2008 | Kent et al. |
| 2008/0232501 A1 | 9/2008 | Khojastepour et al. |
| 2008/0237612 A1 | 10/2008 | Cok |
| 2008/0292013 A1* | 11/2008 | Varadarajan et al. ........ 375/260 |
| 2009/0046801 A1 | 2/2009 | Pan et al. |
| 2009/0109909 A1* | 4/2009 | Onggosanusi et al. ....... 370/329 |
| 2009/0268840 A1* | 10/2009 | Clerckx et al. .............. 375/267 |
| 2009/0323841 A1* | 12/2009 | Clerckx et al. .............. 375/260 |
| 2010/0172430 A1 | 7/2010 | Melzer et al. |
| 2010/0260243 A1 | 10/2010 | Ihm et al. |
| 2011/0092240 A1 | 4/2011 | Aiba et al. |
| 2011/0268100 A1 | 11/2011 | Gorokhov et al. |
| 2012/0087400 A1* | 4/2012 | Kim et al. .................... 375/219 |

FOREIGN PATENT DOCUMENTS

| | | |
|---|---|---|
| JP | 2008521321 A | 6/2008 |
| JP | 2008211414 A | 9/2008 |
| WO | WO-2005117377 A1 | 12/2005 |
| WO | WO-2006054249 A1 | 5/2006 |
| WO | WO-2007027825 A2 | 3/2007 |
| WO | WO-2007112371 A1 | 10/2007 |
| WO | WO-2009038317 A1 | 3/2009 |
| WO | WO-2009119973 A1 | 10/2009 |
| WO | WO-2009128285 A1 | 10/2009 |

OTHER PUBLICATIONS

Marvell Semiconductor: "Precoding options for 8Tx antennas in LTE-A DL", 3GPP Draft; R1-090388_8TXPrecoding, 3rd Generation Partnership Project (3GPP), Mobile Competence Centre; 650, Route Des .Lucioles; F-06921 Sophia-Antipolis Cedex; France, no. Ljubljana; Jan. 9, 2009, XP050318286, [retrieved on Jan. 9, 2009].

NEC: "Multi-resolution Precoding Codebook", 3GPP Draft; R1-093229, 3rd Generation Partnership Project (3GPP), Mobile Competence Centre; 650, Route Des Lucioles; F-06921 Sophia-Antipolis Cedex; France, no. Shenzhen, China; Aug. 19, 2009, XP050351574, [retrieved on Aug. 19, 2009].

QUALCOMM Europe: "DL MU-MIMO operation in LTE-A", 3GPP Draft; R1-094215 LTE-A MU-MIMO, 3rd Generation Partnership Project (3GPP), Mobile Competence Centre; 650, Route Des Lucioles; F-06921 Sophia-Antipolis Cedex; France, no. Miyazaki; Oct. 12, 2009, XP050388684, [retrieved on Oct. 6, 2009].

QUALCOMM Europe: "Feedback in support of Downlink CoMP: General views", 3GPP Draft; R1-094217 Feedback in Support of DL Comp, 3rd Generation Partnership Project (3GPP), Mobile Competence Centre; 650, Route Des Lucioles; F-06921 Sophia-Antipolis Cedex; France, no. Miyazaki; Oct. 12, 2009, XP050388686, [retrieved on Oct. 6, 2009] Section 3, Encoding of time-frequency selective feedback and Conclusion section.

QUALCOMM Europe: "Multiple Description Coding for Spatial Feedback Payload Reduction", 3GPP Draft; R1-090367, 3rd Generation Partnership Project (3GPP), Mobile Competence Centre; 650, Route Des Lucioles; F-06921 Sophia-Antipolis Cedex; France, no. Ljubljana; Jan. 8, 2009, XP050318271, [retrieved on Jan. 8, 2009].

Taiwan Search Report—TW099137663—TIPO—Jul. 26, 2013.

Texas Instruments: "Precoding Codebook Design for 4 Node-B Antenna", 3GPP Draft; R1-071798 TI Codebook 4 ANTS Update, 3rd Generation Partnership Project (3GPP), Mobile Competence Centre; 650, Route Des Lucioles; F-06921 Sophia-Antipolis Cedex; France, vol. RAN WGI, no. St. Julian; Apr. 3, 2007, XP050105709, [retrieved on Apr. 3, 2007].

Varadarajan B., et al., "Nested codebook design for MIMO precoders", Signals, Systems and Computers, 2008 42nd Asilomar Conference on, Oct. 26 to 29, 2008 pp. 723 to 734 Specification and Part III.

Takanashi M, "Interference Cancelation and Equalization in UWB-IR Systems with a Filter Based on an MMSE Criterion," IEICE Technical Report, The Institute of Electronics,Information and Communication Engineers, Mar. 2005, vol. 104, pp. 207-212.

* cited by examiner

METHOD AND APPARATUS FOR HIERARCHICAL CODEBOOK DESIGN IN WIRELESS COMMUNICATION

CROSS-REFERENCE TO RELATED APPLICATIONS

The present Application for Patent is a Divisional of U.S. patent application Ser. No. 12/917,420, filed Nov. 1, 2010, entitled "METHOD AND APPARATUS FOR HIERARCHICAL CODEBOOK DESIGN IN WIRELESS COMMUNICATION," which claims the benefit of U.S. Provisional Patent Application No. 61/257,420, filed Nov. 2, 2009, entitled "METHOD AND APPARATUS FOR HIERARCHICAL CODEBOOK DESIGN USED IN WIRELESS COMMUNICATION SYSTEM," all of which are assigned to the assignee hereof and hereby expressly incorporated by reference in their entirety.

BACKGROUND

I. Field of the Invention

The present disclosure relates generally to communication, and more specifically to techniques for generating and using codebooks in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. The beamforming may be achieved by precoding data prior to transmission. The precoding may be performed at a transmitter using a precoding matrix from a codebook. The codebook is known to both the transmitter and the intended receiver. In certain operational conditions, it may be desirable to change or update the precoding matrix used for transmission from time to time. To facilitate the selection of an appropriate precoding matrix, a receiver may provide feedback regarding channel conditions. In a system with multiple transmit antennas and multiple ranks of transmission, such as a multi-user MIMO (MU-MIMO) system, the feedback in the uplink direction may require greater bandwidth than conventional systems.

Better methods for generating codebooks and providing channel condition feedback in a MIMO wireless communication systems are needed.

SUMMARY

The systems and methods provided in this disclosure meet the above discussed needs, and others. Briefly and in general terms, the disclosed designs provide methods and apparatuses for generating hierarchical codebooks based on transmission ranks, and using the hierarchical codebooks in a multiple description coding (MDC) feedback scheme.

In an aspect, a method for wireless communications is provided. The method includes generating a family of codebooks comprising at least one codebook set, the codebook set comprising a plurality of codebooks organized base on a transmission rank; and providing the family of codebooks for use in a multiple description coding (MDC) channel feedback scheme.

In another aspect, an apparatus for wireless communication is provided. The apparatus includes means for generating a family of codebooks comprising at least one codebook set, the codebook set comprising a plurality of codebooks organized base on a transmission rank; and means for providing the family of codebooks for use in a multiple description coding (MDC) channel feedback scheme.

In yet another aspect, a computer program product is provided which includes a computer-readable storage medium. The computer-readable storage medium comprises instructions for causing at least one computer to generate a family of codebooks comprising at least one codebook set, the codebook set comprising a plurality of codebooks organized base on a transmission rank; and instructions for causing the at least one computer to provide the family of codebooks for use in a multiple description coding (MDC) channel feedback scheme.

In a further aspect, an apparatus for wireless communication is provided. The apparatus includes a processor configured for: generating a family of codebooks comprising at least one codebook set, the codebook set comprising a plurality of codebooks organized base on a transmission rank; and providing the family of codebooks for use in a multiple description coding (MDC) channel feedback scheme.

In another aspect, a method for wireless communication is provided. The method includes receiving a plurality of channel quality reports from a user equipment (UE), according to a multiple description coding (MDC) schedule; and determining a transmission parameter based on the plurality of channel quality reports.

In yet another aspect, an apparatus for wireless communication is provided. The apparatus includes, comprising means for receiving a plurality of channel quality reports from a user equipment (UE), according to a multiple description coding (MDC) schedule; and means for determining a transmission parameter based on the plurality of channel quality reports.

In a further aspect, a computer program product comprising a computer-readable storage medium is provided. The computer-readable storage medium includes instructions for causing at least one computer to receive a plurality of channel quality reports from a user equipment (UE), according to a multiple description coding (MDC) schedule; and instructions for causing the at least one computer to determine a transmission parameter based on the plurality of channel quality reports.

In another aspect, an apparatus for wireless communication is provided. The apparatus includes a processor configured for: receiving a plurality of channel quality reports from a user equipment (UE), according to a multiple description coding (MDC) schedule; and determining a transmission parameter based on the plurality of channel quality reports.

In yet another aspect, a wireless communication method is provided. The method includes receiving a family of codebooks organized based on a transmission rank; and reporting, using a multiple description coding (MDC) scheme, a channel quality parameter using a codebook entry from the family of codebooks.

In further aspect, a wireless communication apparatus is provided. The apparatus includes means for receiving a family of codebooks organized based on a transmission rank; and means for reporting, using a multiple description coding (MDC) scheme, a channel quality parameter using a codebook entry from the family of codebooks.

In another aspect, a computer program product comprising a computer-readable storage medium is provided. The computer-readable storage medium includes instructions for causing at least one computer to receive a family of codebooks organized based on a transmission rank; and instructions for causing the at least one computer to report, using a multiple description coding (MDC) scheme, a channel quality parameter using a codebook entry from the family of codebooks.

In yet another aspect, a wireless communication apparatus is provided. The apparatus includes a processor configured for receiving a family of codebooks organized based on a transmission rank; and reporting, using a multiple description coding (MDC) scheme, a channel quality parameter using a codebook entry from the family of codebooks.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

The DL PHY channels may include Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH).

The UL PHY Channels may include Physical Random Access Channel (PRACH), Physical Uplink Shared Channel (PUSCH), and Physical Uplink Control Channel (PUCCH).

Briefly and in general terms, techniques for providing channel quality feedback in the uplink direction are disclosed. In one aspect, a family of codebooks is generated using a hierarchical design. In some designs, the generated codebooks are nested across transmission ranks. In some designs, the generated codebooks are hierarchical with respect to the transmission rank. In one aspect, codebooks are provided to both a base station and a user equipment (UE) for use during the channel quality feedback.

Briefly and in general terms, a technique, called multiple description coding (MDC) is used to allow fine granular representation of channel conditions. A schedule is provided for using MDC based reporting of channel parameters from a UE to a base station. In one aspect, the use of hierarchical or nested codebooks advantageously helps reduce the bit overhead of reporting channel parameters for different transmission ranks. These and other aspects are further disclosed below.

Figure 1:
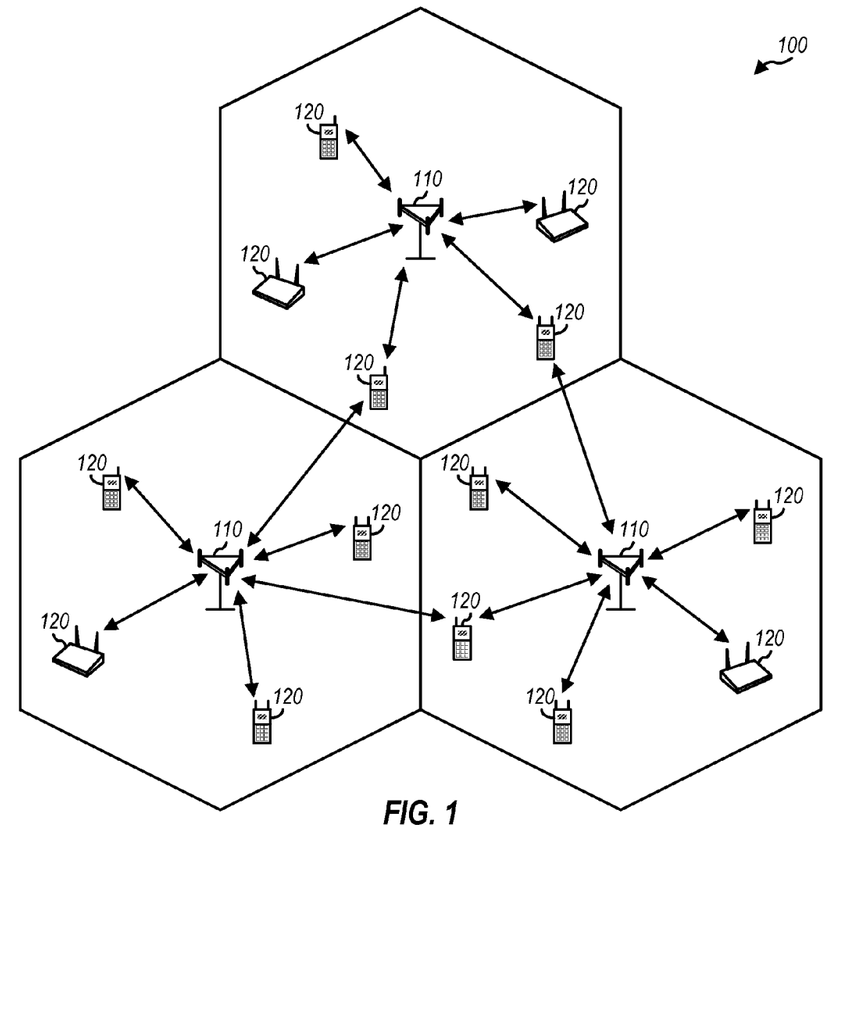
FIG. 1 illustrates a wireless communication system.

FIG. 1 shows a wireless communication system 100, which may be an LTE system or some other system. System 100 may include a number of evolved Node Bs (eNBs) 110 and other network entities. An eNB 110 may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE 120 may be stationary or mobile. A UE 120 may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 mega-Hertz (MHz), respectively. The system bandwidth may correspond to a subset of the K total sub carriers.

Figure 2:
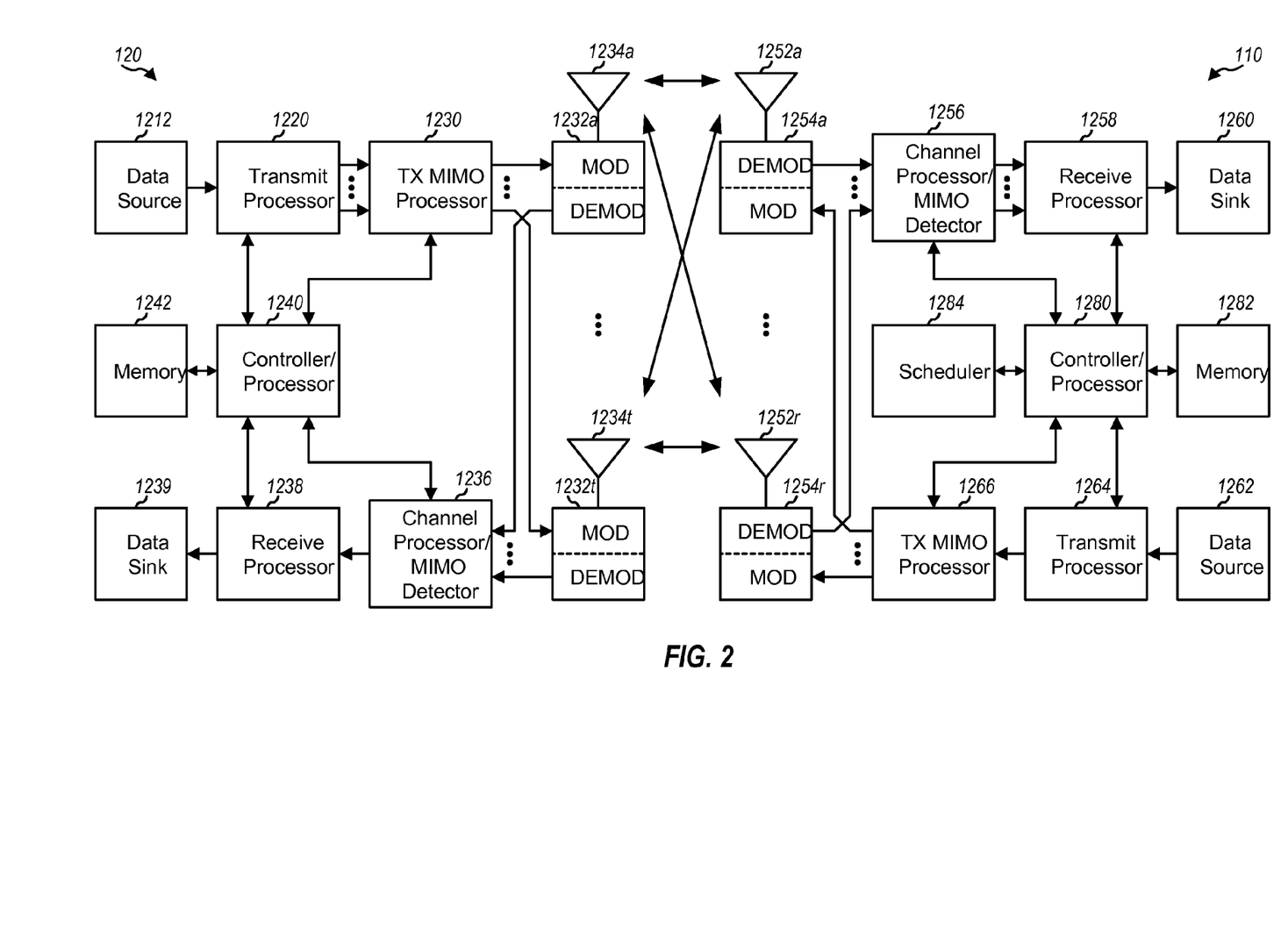
FIG. 2 illustrates an exemplary transmission structure.

FIG. 2 shows a block diagram of a design of an exemplary base station/eNB 110 and a UE 120, which may be one of the eNBs and one of the UEs in FIG. 1, where the various processes disclosed above may be implemented, as appropriate. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct processes (e.g., process 700 of FIG. 7) for the techniques described herein. Processor 1256, processor 1280, and/or other processors and modules at base station 110 may perform or direct processes (e.g., process 300 of FIG. 3 and process 500 of FIG. 5) for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Different enhancements are being considered in next releases of LTE-A to improve user experience and system performance. Some example enhancement areas include the introduction of spatial processing techniques such as SU-MIMO with up to 8 layer of transmission, the use of multi-user MIMO (MU-MIMO) configurations and the use of cooperative multipoint transmission (CoMP) to coordinate transmissions by multiple nodes in a wireless network.

To support different spatial processing techniques in an efficient manner, new feedback mechanisms, control signaling and reference signals are disclosed herein. In some designs, new feedback mechanisms provide information about the spatial structure of the channel and the channel quality, and rank (CQI/RI) to the scheduler (e.g., the eNB 110). The information communicated back by a receiver (e.g., the UE 120) to a transmitter (e.g., the eNB 110) is referred herein as "channel structure" or "channel parameters." It is to be understood that the terms "channel structure" or "channel parameter" refer to the feedback provided by a receiver (e.g., UE 120) to the transmitter (e.g., eNB 110) to facilitate optimized transmission from the transmitter to the receiver.

For example, in some designs, channel parameters may include a channel quality index (CQI), an estimated rank for transmission, and so on. The eNB 110 may use the received channel structure information (or channel parameters) to "optimize" transmissions from the eNB 110 to the UE 120. The term "optimization" may refer to transmission improvements such as using a particular precoding matrix for beamforming, or selecting a particular rank for transmissions or increased the reliability of transmission by using error correction codes or increasing noise margin, and so on.

In some designs, a channel spatial structure may be indicated in the feedback from a receiver to a transmitter by estimating a channel matrix based on the received signal and by quantizing the channel matrix estimate to the nearest entry in a codebook. One or more codebooks may be known to both a receiver and a transmitter. Thus, a receiver may simply indicate to the transmitter which codebook entry to use for subsequent transmissions. The channel matrix estimate may include parameters that are continuously variable (i.e., take on a large number of possible values), but the available number of codebook entries may be finite. Therefore, a receiver may have to decide how to signal a calculated channel matrix using available codebook entries. In other words, a receiver may "quantize" channel parameters, when providing feedback to the transmitter.

In some designs, the codebooks used by the receiver and the transmitter may be changed or updated from time to time. For example, in LTE networks, the eNB 110 may update codebooks used by a UE 120 at a startup time or during run time via higher layer messages. Furthermore, codebooks stored and used at the eNB 110 may also be updated by a wireless network operator from time to time, to improve system performance.

The differences between the actual calculated values and the reported quantized channel parameters may impact system performance. To minimize such quantization errors, various techniques may be utilized for representing channel parameters using a finite number of codebook entries. For example, in some designs, scalar quantization of the elements of the channel matrix may be performed. In a scalar quantization technique, reported values may be chosen on a parameter by parameter basis, from corresponding available values in a codebook.

In some designs, vector quantization may be performed. In a vector quantization technique, a "nearest" vector entry from a codebook may be selected to feed back a channel parameter vector (e.g., an eigenvector for beamforming) based on a predefined metric such as a chordal distance, or capacity calculation for reporting back to the transmitter.

In some designs, codebooks structures with different sizes may be used to reduce quantization errors. The size of the codebook (i.e., the number of possible entries) used may help improve the accuracy of the feedback by allowing a more granular representation of calculated channel parameter values.

In some designs, the amount of bandwidth needed to report channel parameters from a receiver to a transmitter (e.g., from the UE 120 to the eNB 110) may be reduced by employing a variety of feedback encoding and compression techniques. For example, in certain designs, feedback information regarding only a single dominant eigen-component (or a first certain number of dominant eigen-components) of the channel may be fed back from the UE 120 to the eNB 110. In some designs, the UE 120 may compute eigen-directions of a channel covariance matrix and report a certain pre-determined number (e.g., one or two) of dominant eigen-directions only. There may be hard and soft limits on the number of eigen-directions fed back based on different criteria and procedures agreed by eNB 110 and UE 120. For example, in some designs, a maximum upper limit on the number of eigen-vectors may be used. In some designs, the UE 120 may report eigen-vectors that provide better capacity along a particular beam direction, and so on.

In some designs, the decision process at a UE 120 about which eigen-directions to report, may also consider eigen-directions not just for the serving cell of the UE 120, but also for a neighboring cell as well. Such a scheme may be useful in networks implementing cooperative multipoint transmission (CoMP) configurations of LTE-A, to avoid interference between transmissions to/from different eNBs 110.

Additional reduction in the amount of uplink bandwidth required to communicate channel parameters and/or to reduce quantization errors in reporting may be achieved by transforming or projecting actual channel matrix values to another space. For example, in some designs, eigenvectors computed for a whitened channel version of the actual channel may be communicated to the transmitter. In some designs, the whitening may be performed with respect to an interference observed from transmissions of a non-cooperating cell. In some designs, the channel may be whitened using a long-term covariance structure of the channel. The UE 120 may calculate the long-term covariance structure, for example, over several hundreds of subframes. The whitening over a long term observation window may be particularly useful in configurations where transmit antennas are closely spaced or in propagation scenarios with small angular spread. In some designs, the eigen-vectors may be calculated based on a projection in a particular direction, which assumes a particular receiver beamforming vector.

Another technique called feedback encoding may also be used to reduce the uplink bandwidth required to report channel parameters from the UE 120 to the eNB 110. In a feedback encoding design, data compression, based on channel correlation in time/frequency/space dimensions, may be used to reduce transmission overhead for reporting the channel conditions. Alternatively, channel correlation may be used to improve the accuracy of the channel knowledge at the scheduler (e.g., the eNB 120) in a given amount of upstream bandwidth.

Multiple description coding (MDC) is yet another technique that may be used to reduce quantization errors in reporting channel parameter feedback from the UE 120 to the eNB 110. Each MDC report may be considered to provide a "look" of the channel from a UE's vantage point. The look may, for example, be associated with a time period and/or a frequency band. Broadly speaking, in an MDC scheme, the UE 120 may provide the eNB 110 information about various looks of the channel over a period of time and a span of frequency. Correspondingly, the eNB 110 may combine the received different looks to derive a better estimate of reported channel conditions. Combining different reports (or "looks") may improve the accuracy of channel knowledge at the eNB 110. In other words, using MDC, the UE 120 may be able to improve the granularity of reporting (i.e., reduce the quantization error) of channel conditions. Of course, the eNB 110 is free to combine or not combine received channel feedbacks because each channel feedback may be close to the actual calculated value at a UE 120. In an MDC scheme, codebook structures may be used to provide different looks of the channel at different time instances and/or frequency bands. Combining reports based on these codebooks can reduce quantization errors. This, and other aspects of using codebooks MDC coding are further described below.

To illustrate the MDC coding scheme, assume that a codebook being used by the UE 120 comprises integer channel parameter values only. In this scenario, to feed back a channel parameter value "2.5," in conventional systems, a UE 120 may have to make a decision about whether to signal the desired channel parameter value "2.5" using, entry "2" or entry "3." However, in an MDC scheme, the UE 120 may alternate (ping pong) between values "2" and "3." At the eNB 110, the received values "2" and "3" may be averaged or lowpass filtered to arrive at the value "2.5" intended by the UE 120. It will be appreciated that by adjusting the duty cycle of reported codebook values over a reporting period, it may be possible to report a large number of intermediate channel parameter values by the UE 120. Correspondingly, the eNB 110 may recover these intermediate values by averaging over the given MDC reporting period.

When operational conditions are such that the communication channel between the eNB 110 and the UE 120 are slowly varying, compared to the time instances of channel parameter feedback, finer granularity of signaled channel parameter values can be achieved using long patterns of available codebook values. For example, when the channel is a wideband LTE channel, frequency domain properties of the channel may not change rapidly, compared to a typical feedback period of 5 to 10 subframes. In such a case, ten consecutive channel parameter reports may be averaged to report channel parameter values accurate to the first decimal place (assuming integer codebook entries).

In some designs, MDC codebooks may have an associated predetermined schedule of transmission. The MDC schedule may facilitate fine granular reporting of channel parameters, such as described above. The MDC schedule may include, for example, information regarding the sequence of transmission of channel parameters, which codebooks from a set of codebooks to use, and how parameter averaging is to be performed. Further details of the MDC scheduling and codebook sets are provided below.

In some designs, multiple sets of codebooks may be available for use by a receiver. For example, for the previously discussed example related to signaling a channel parameter value "2.5" using available codebook entries "2" and "3," in certain designs, a UE 120 may have two sets of codebooks available. A first codebook may allow reporting channel parameter values $\{1, 2, 3 \ldots \}$ while a second codebook may allow reporting half-integer values $\{0.5, 1.5, 2.5, \ldots \}$. In such a case, to signal channel parameter 2.5, the UE 120 may select either transmission of alternating "2" and "3" from the first codebook, as previously described, or may directly signal "2.5" from the second codebook. The UE's choice of which codebook to use may depend on the scheduling scheme associated with the feedback. It should be emphasized that the example codebooks comprising integer and half-integer values are for illustrative purposes only. The MDC techniques described herein are applicable to any type of codebook entries, including rational or irrational values.

In some designs, codebooks may be designed to facilitate channel parameter reporting using low uplink bandwidth and/or reduced quantization error. In some designs, codebook design may be performed a priori and the designed codebooks may be stored at the eNB 110 and the UE 120. The design and generation of codebooks may be performed at a computer (which may or may not be located at the eNB 110) and then the codebooks may be communicated to the eNB 110 and/or UE 120 for future use. In some designs, the new codebooks may be generated based on observed channel conditions or a transmission configurations (e.g., antenna configuration at the eNB 110). In some designs, new codebooks may be provided to the UE 120 via high level signaling.

In some designs, codebooks may be generated to using a nested architecture. In some nested architecture designs, codebooks may be nested across transmission ranks. This property may mean that codebooks used for a lower transmission rank nay be extended to obtain codebooks for a higher transmission rank. For example, in a nested architecture, rank 1 vectors in codebook for rank 1 are columns of a subset of rank 2 matrices present in codebook for rank 2.

In some designs, codebook structures may be designed for different ranks to be compatible with MDC techniques discussed above. In other words, codebooks may be both rank nested and be able to provide reporting with low quantization errors, using MDC scheduling. It will be appreciated that the availability of such codebooks at a UE 120 facilitates an MDC feedback scheme, including rank selection by the UE 120.

In some designs, a nested structure may be provided for each codebook among a set of codebooks used by MDC. In other words, a family of nested codebook sets, may be defined as follows:

$$F=\{S_1, S_2, \ldots, S_k\}; \quad \text{Eq.(1)}$$

where k is the number of codebook sets in the family F. The family F may be partitioned as follows. Each $S_i$ may be a nested codebook set that contains codebooks for rank 1 to the desired rank say $r_i$. In other words, each $S_i$ may be represented as follows:

$$S_i=\{C_{1,i}, C_{2,i}, \ldots, C_{r_i,i}\}; \quad \text{Eq. (2)}$$

where $C_{j,i}$, is the codebook for rank j in set i. Variables i, j and $r_i$ are integers. At each time/frequency instance, one of the codebook sets $S_i$ may be chosen and within that set for different ranks (e.g. j) the $C_{j,i}$ may be used for reporting.

In some designs, codebooks may be designed to have a hierarchical structure across transmission ranks. For example, a family of, $N_1$ codebooks, each codebook having $M_1$-bits, may be defined for rank 1, based on a particular criterion such as inner product metric ($N_1$ and $M_1$ both integers). Let the family of codebooks be denoted by $$F_1=\{C_{1,1}, \ldots C_{1,N1}\} \quad \text{Eq. (3)}$$

where each $C_{1,j}$ is of size $2^{M_1}$.

The family $F_1$ of $N_1$ codebooks may be partitioned into a smaller number of families, say $N_2$ families, i.e. $F_2=\{C_{2,1}, \ldots C_{2,N2}\}$. A subset of the set of rank 1 vectors in each family can be selected and extended by a particular criterion, e.g. chordal distance, orthogonal component, to rank 2 matrices. In this case MDC for rank 1 UEs 120 (i.e., UEs 120 for which the transmission channel has rank 1) may use family $F_1$ of $N_1$ codebooks (of size $M_1$-bit each). Similarly, for rank 2 UEs, family $F_2$ of $N_2$ codebooks may be used. If all the rank 1 vectors in each family are selected, then codebooks of family F2 will be of size $M_1+\log_2(N_1/N_2)$ each. It will be appreciated that the codebooks, as defined above, also have a nested structure. This approach can be extended to higher ranks by repeating the process of nesting.

In some design, the nested structure of the codebook families may be obtained by a top-down process starting from the family of codebooks for higher rank transmission. Let the family of codebooks constructed for higher rank transmission be $F_2=\{C_{2,1}, \ldots C_{2,N2}\}$, $C_{2,j}$ is the j-th codebook in the family. In this case, one can first select a subset of codebooks from $F_2$, the family of codebooks constructed for higher rank transmission. Let this subset of codebooks be denoted as $G=\{C_{2,i1}, \ldots C_{2,ik}\}$. For each codebook in G, subset of codebooks chosen, multiple sub-sampled codebooks are generated by selecting a subset of matrices in that codebook and partitioning them into multiple sub-sampled codebooks. Each of the sub-sampled codebooks can be used as instance of MDC codebook for lower rank transmissions. It will be appreciated that the codebooks, as defined above, also have a nested structure. This approach can be extended to higher ranks by repeating the process of nesting.

In general, the size of the codebooks used for different ranks can be different. In some designs, finer granularity codebooks may be provided for lower ranks (because in typical operational scenarios, lower rank channel parameters may be used more frequently and may be applicable to all scenarios). Correspondingly, higher rank codebook may be designed to have smaller sizes than the lower rank codebooks.

In some designs, a codebook design can be configurable and different codebooks can be defined and semi-statically assigned for feedback computation to different UEs 120. The choice of the codebook assigned to each UE 120 may be based on different parameters such as UE channel conditions, e.g. Doppler, angular spread, or network configurations, e.g. Tx antenna configuration, number of UEs and dominant operation mode (SU, MU or CoMP). Furthermore, the assigned codebooks may also depend on transmission antenna configuration at the eNB 110. For example, when an eNB 110 has linearly spaced antennas, the transmission pattern may be FFT-like and a codebook set generated using rotation of matrices may be used.

In some designs, the family of codebooks used may be selected semi-statically for use between UEs 120 and eNB 110. The selection (and changes to the selected family) may be communicated by the eNB 110 via a higher layer message. The selection is called semi-static in the sense that the selection of the family of codebooks used may be kept unchanged over several tens of subframe duration (e.g., over 10 or 100 or 1000 subframes).

In some designs, the above-discussed MDC feedback schemes may be used in a tiered manner. In a tiered scheme, for example, channel parameters may be sent using a conventional feedback scheme. In addition to the conventional feedback scheme, MDC reporting may be used to inform the eNB 110 about deviations to the previously reported channel parameters, reported using a conventional feedback scheme. As previously discussed, MDC techniques facilitate reporting of highly granular values (i.e., lower quantization errors). Therefore, in one aspect, the tiered technique may allow "fine tuning" of reported channel parameters. For example, when angular spread of a transmitted beam from the eNB 110 is small (e.g., 10 degrees or lower), then eigenvector directions used for beamforming may not change rapidly (e.g., on a subframe by subframe basis). A small beamforming angle may be achieved, for example, when transmit antennas on the eNB 110 are closely spaced, relative to the wavelength of transmission. A tiered feedback scheme may be used in such configurations.

Figure 3:
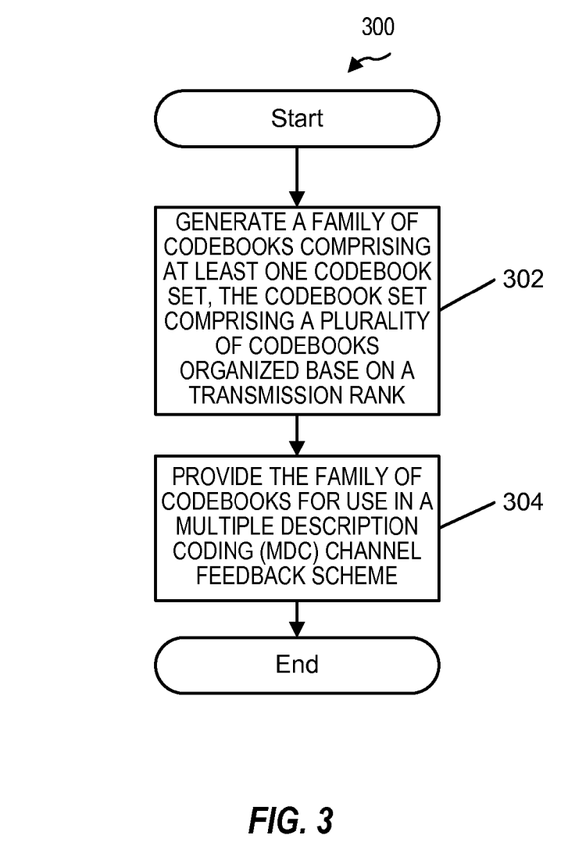
FIG. 3 illustrates a flow chart representation of a process for wireless communication.

FIG. 3 is a flow chart showing a process 300 of wireless communication in a MU-MIMO system. At block 302, a family of codebooks comprising at least one codebook set, the codebook set comprising a plurality of codebooks organized base on a transmission rank, is generated. The codebook set comprises a plurality of hierarchical codebooks. The codebooks may be generated as described with respect to Eqs. (1) to (3) above. At block 304, the family of codebooks for use in a multiple description coding (MDC) channel feedback scheme is provided. As previously discussed, the family of codebooks may be organized hierarchically or in a nested fashion, based on the transmission rank. The codebook generation may be performed at a computer communicatively coupled to the eNB 110.

In some designs, an MDC schedule is and provided for use with the MDC feedback scheme. Various possibilities of MDC schedule, e.g., using MDC for fine granularity refinement, have been discussed herein. Furthermore, the generation of MDC schedule may include generation of MDC schedule based on transmission configuration of the eNB 110 and/or the UE 120 and operation conditions such as channel quality.

In some designs, the family of codebooks may be partitioned in a plurality of subfamilies based on the transmission rank, wherein codebooks for transmission ranks greater than one are generated by extending rank 1 codebooks according to a criterion. The transmission criterion used for extending from rank 1 codebooks to higher rank codebooks may include chordal distance or may be based on an orthogonal component method, as previously discussed.

In some designs, the family of codebooks may be partitioned into a plurality of subfamilies, each subfamily comprising codebooks for a plurality of transmission ranks, as previously discussed with respect to Eq. (1).

In some designs, as previously discussed, the family of codebooks may be generated using a random, a Gaussian or a unitary matrix as a starting point. In some designs, the family of codebooks may be generated based on a transmitter configuration such as a number of antennas, the placement of antennas and so on.

Figure 4:
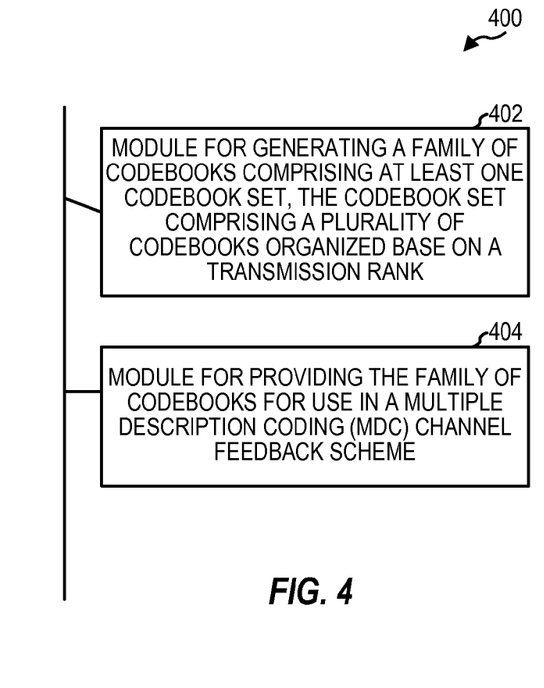
FIG. 4 illustrates a block diagram representation of a portion of an apparatus for wireless communication.

FIG. 4 is a block diagram representation of a portion of a wireless communication apparatus 400 comprising module 402 for generating a family of codebooks comprising at least one codebook set, the codebook set comprising a plurality of codebooks organized base on a transmission rank and module 404 for providing the family of codebooks for use in a multiple description coding (MDC) channel feedback scheme. The family of codebook may be provided to the eNB 110 and the UE 120 a priori, or during run time, by sending higher layer messages from the eNB 110 to the UE 120. The wireless communication device 400 may, for example, be a computer coupled to the eNB 110. The communication apparatus 400, including modules 402 and 404 may further implement one or more of the previously discussed codebook generation techniques for feedback bandwidth reduction and/or quantization error reduction.

Figure 5:
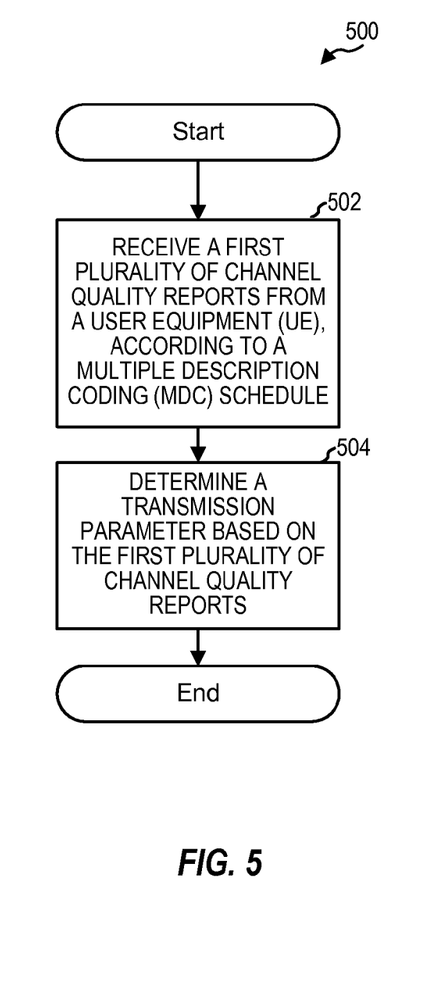
FIG. 5 illustrates a flow chart representation of a process for wireless communication.

FIG. 5 is a flow chart representation of a process 500 of a method for use in a wireless communication system. The process 500 may, for example, be implemented at the eNB 110. At block 502, a first plurality of channel quality reports are received from a UE 120, according to a multiple description coding (MDC) schedule. At block 504, a transmission parameter is determined based on the first plurality of channel quality reports. In some designs, each channel quality report from the first plurality of channel quality reports comprises an indication of a codebook entry.

In some designs, a second plurality of channel quality reports, not scheduled according to the MDC schedule, is received. The second plurality of channel quality reports may for example be used to determine the transmission parameters. In some designs, a first value is calculated using the first plurality of channel quality reports to adjust a second value calculated using the second plurality of channel quality reports.

Figure 6:
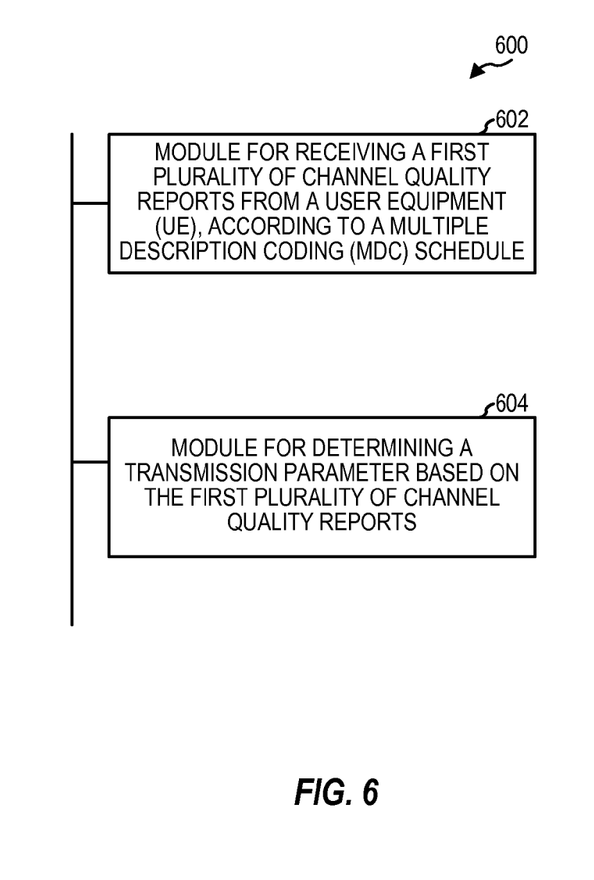
FIG. 6 illustrates a block diagram representation of a portion of an apparatus for wireless communication.

FIG. 6 is a block diagram representation of a portion of a wireless communication apparatus 600, comprising module 602 for receiving a first plurality of channel quality reports from a user equipment (UE), according to a multiple description coding (MDC) schedule and module 604 for determining a transmission parameter based on the first plurality of channel quality reports. The wireless communication apparatus 600 may be, for example, the eNB 110. The apparatus 600 and modules 602, 604 may further implement one or more of the techniques for reducing feedback bandwidth and/or quantization errors using hierarchical codebooks, as disclosed herein.

Figure 7:
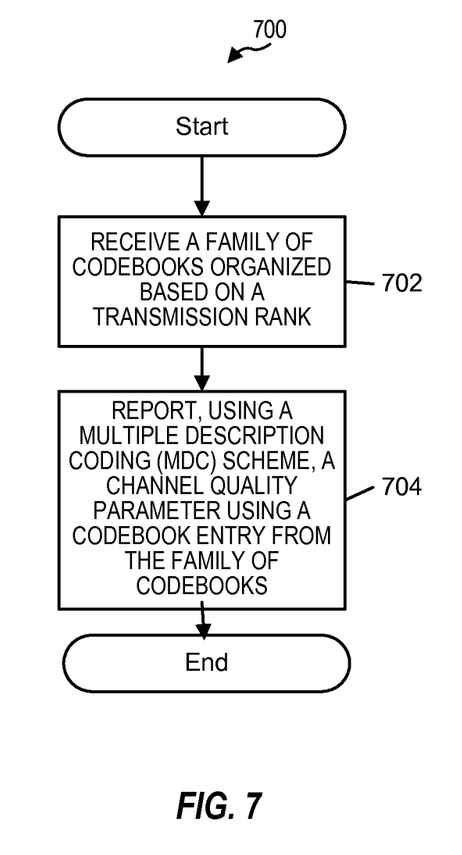
FIG. 7 illustrates a flow chart representation of a process for wireless communication.

FIG. 7 is a flow chart representation of a process 700 of wireless communication. The process 700 may, for example, be implemented at the UE 120. At block 702, a family of codebooks organized based on a transmission rank is received. At block 704, a channel quality parameter using a codebook entry from the family of codebooks is reported using a multiple description coding (MDC) scheme. In some designs, the channel quality parameter may comprise the desired transmission rank. The family of codebooks received may be hierarchically organized according to transmission ranks. The codebook entry reported in block 704 may be selected based on the desired transmission rank. In some designs, the family of codebooks may be nested according to the transmission ranks. The family of codebooks received may be, for example, as discussed with respect to Eqs. (1) to (3) above.

Figure 8:
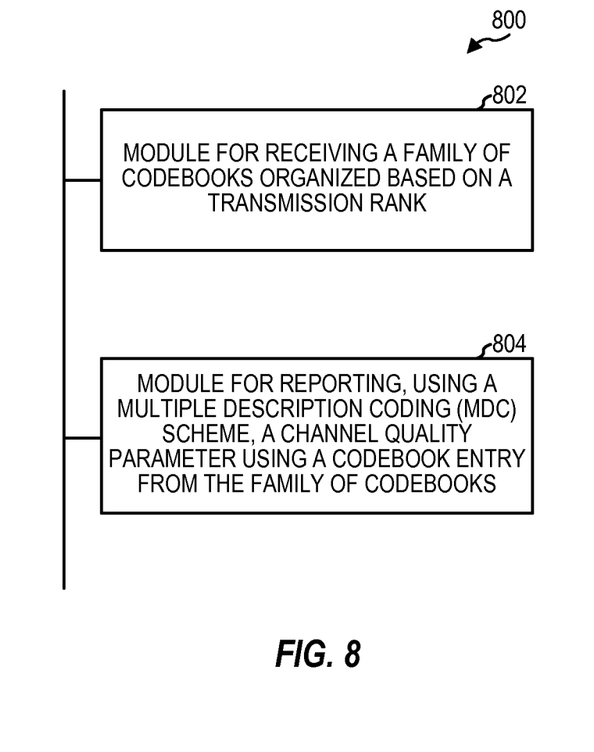
FIG. 8 illustrates a block diagram representation of a portion of an apparatus for wireless communication.

FIG. 8 is a block diagram representation of a portion of a wireless communication apparatus 800, comprising module 802 for receiving a family of codebooks organized based on a transmission rank and module 804 for reporting, using a multiple description coding (MDC) scheme, a channel quality parameter using a codebook entry from the family of codebooks. The communication apparatus 800, including modules 802 and 804 may further implement one or more of the previously discussed codebook generation techniques for feedback bandwidth reduction and/or quantization error reduction.

In some designs, the channel quality parameter comprises a desired transmission rank that the eNB 110 should use when communicating with the UE 120.

In some designs, the received family of codebooks is hierarchically organized according to transmission ranks and the UE 120 selects a codebook entry corresponding to the desired transmission rank and reports the selected codebook entry to the eNB 110.

It will be appreciated that in the foregoing description, several techniques for reducing quantization errors and/or bandwidth overhead associated with providing channel feedback from a receiver to a transmitter are provided. Techniques have been disclosed for generating codebooks. In one aspect, the codebooks may be organized into families of codebooks according to the desired transmission rank. In one aspect, the codebooks may be especially usefully in providing channel feedback using a multiple description coding (MDC) feedback scheme.

It will further be appreciated that techniques have been disclosed to generate families of codebooks hierarchically organized according to a transmission rank. In one aspect, the hierarchical arrangement may comprise a family of $N_1$ codebooks for rank 1. Codebooks for higher ranks, e.g., rank 2, may be generated by extending rank 1 codebooks using a particular criterion such as minimizing a chordal distance between generated matrices or by extending rank 1 matrices along particular orthogonal components, etc.

It will further be appreciated that techniques have been disclosed to organize families of codebooks by nesting based on transmission ranks. In one aspect, a family of codebooks may comprise nested codebook sets, with each codebook set comprising codebooks for ranks 1 through r1 (where r1 is an integer greater than 1).

It will further be appreciated that the codebook families may be used for channel parameter feedback using an MDC scheme. It will be appreciated that the combination of MDC and codebooks nested according to transmission ranks provides previously unobtainable savings in uplink bandwidth overhead and/or reduction in quantization error, while still allowing a UE 120 to provide feedback based on a desired transmission rank for transmissions from the eNB 110 to the UE 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, comprising:
receiving a plurality of channel quality reports, from a user equipment (UE), according to a multiple description coding (MDC) scheme that specifies a predetermined schedule for using at least one specific codebook from a plurality of codebooks for a channel quality report of the plurality of channel quality reports; and
determining a transmission parameter based on the plurality of channel quality reports.

2. The method of claim 1, wherein each channel quality report from the plurality of channel quality reports comprises an indication of a codebook entry.

3. The method of claim 1, further comprising receiving another plurality of channel quality reports not scheduled according to an MDC schedule.

4. The method of claim 3, wherein the determining the transmission parameter comprises using a first value calculated with the plurality of channel quality reports to adjust a second value calculated with the another plurality of channel quality reports.

5. An apparatus for wireless communication, comprising:
a memory; and
a processor coupled to the memory and configured to:
receive a plurality of channel quality reports, from a user equipment (UE), based on a multiple description coding (MDC) scheme that specifies a predetermined schedule for using at least one specific codebook from a plurality of codebooks for a channel quality report of the plurality of channel quality reports, and
determine a transmission parameter based on the plurality of channel quality reports.

6. The apparatus of claim 5, wherein each channel quality report from the plurality of channel quality reports comprises an indication of a codebook entry.

7. The apparatus of claim 5, wherein the processor is further configured to receive another plurality of channel quality reports not scheduled according to an MDC schedule.

8. The apparatus of claim 7, wherein the processor is configured to determine the transmission parameter by using a first value calculated with the plurality of channel quality reports to adjust a second value calculated with the another plurality of channel quality reports.

9. A wireless communication method, comprising:
receiving, by a wireless device, a family of codebooks organized based on a transmission rank; and
reporting, by the wireless device, a channel quality parameter based on a multiple description coding (MDC) scheme that specifies a predetermined schedule for using at least one codebook entry from the family of codebooks for the channel quality parameter.

10. The method of claim 9, wherein the channel quality parameter comprises a desired transmission rank.

11. The method of claim 10, wherein the family of codebooks is hierarchically organized according to transmission ranks and the codebook entry is further selected based on the desired transmission rank.

12. The method of claim 10, wherein the family of codebooks is nested according to transmission ranks and the codebook entry is further selected based on the desired transmission rank.

13. A wireless communication apparatus, comprising:
   a memory; and
   a processor coupled to the memory and configured to:
      receive a family of codebooks organized based on a transmission rank; and
      report a channel quality parameter based on a multiple description coding (MDC) scheme that specifies a predetermined schedule for using at least one codebook entry from the family of codebooks for the channel quality parameter.

14. The apparatus of claim 13, wherein the channel quality parameter comprises a desired transmission rank.

15. The apparatus of claim 14, wherein the family of codebooks is hierarchically organized according to transmission ranks and the codebook entry is further selected based on the desired transmission rank.

16. The apparatus of claim 14, wherein the family of codebooks is nested according to transmission ranks and the codebook entry is further selected based on the desired transmission rank.

* * * * *